(12) United States Patent  
Künzelmann

(10) Patent No.: US 11,946,498 B2  
(45) Date of Patent: Apr. 2, 2024

(54) FLOW CONDITIONER

(71) Applicant: SICK Engineering GmbH, Ottendorf-Okrilla (DE)

(72) Inventor: Mario Künzelmann, Dresden (DE)

(73) Assignee: SICK ENGINEERING GMBH, Ottendorf-Okrilla (DE)

(*) Notice: Subject to any disclaimer, the term of this patent is extended or adjusted under 35 U.S.C. 154(b) by 90 days.

(21) Appl. No.: 17/506,375

(22) Filed: Oct. 20, 2021

(65) Prior Publication Data

US 2022/0128070 A1 Apr. 28, 2022

(30) Foreign Application Priority Data

Oct. 22, 2020 (EP) .................................... 20203266

(51) Int. Cl.  
*F15D 1/02* (2006.01)  
*G01F 15/00* (2006.01)

(52) U.S. Cl.  
CPC .............. *F15D 1/02* (2013.01); *G01F 15/00* (2013.01)

(58) Field of Classification Search  
CPC .................................. G01F 15/00; F15D 1/02  
USPC ........................................................ 73/272 R  
See application file for complete search history.

(56) References Cited

U.S. PATENT DOCUMENTS

| | | | |
|---|---|---|---|
| 5,363,699 A | 11/1994 | McCall | |
| 5,529,093 A * | 6/1996 | Gallagher | F15D 1/025 138/40 |
| 5,596,152 A * | 1/1997 | Bergervoet | F15D 1/0005 138/44 |
| 7,347,223 B2 * | 3/2008 | Richter | F15D 1/02 138/37 |
| 9,829,016 B2 * | 11/2017 | Gurr | F15D 1/02 |
| 2010/0224275 A1 * | 9/2010 | Pinkerton | F15D 1/02 366/337 |
| 2013/0306183 A1 * | 11/2013 | Sawchuk | F15D 1/02 138/44 |
| 2014/0338771 A1 | 11/2014 | Brown | |
| 2016/0103004 A1 * | 4/2016 | Ehrlich | G01F 1/662 73/861.28 |
| 2020/0378414 A1 * | 12/2020 | Leutwyler | F15D 1/04 |

FOREIGN PATENT DOCUMENTS

| | | |
|---|---|---|
| DE | 102016112295 A1 | 1/2018 |
| EP | 2607718 A1 | 6/2013 |
| EP | 3745095 A1 | 12/2020 |

(Continued)

OTHER PUBLICATIONS

European Search Report dated Apr. 13, 2021 corresponding to application No. 20203266.0-1001.

(Continued)

*Primary Examiner* — Nathaniel T Woodward  
(74) *Attorney, Agent, or Firm* — Nath, Goldberg & Meyer; Jerald L. Meyer

(57) ABSTRACT

A flow conditioner for conditioning a fluid flow comprises a pipe that has a pipe axis and that can be flowed through by a fluid in the direction of the pipe axis; and at least one hub body that is rotationally symmetrical with respect to an axis of symmetry and that is fixed in the pipe such that the axis of symmetry coincides with the pipe axis, wherein the hub body fixed in the pipe has an onflow region that is arched outwardly against the onflow direction.

20 Claims, 3 Drawing Sheets

(56) References Cited

FOREIGN PATENT DOCUMENTS

| KR | 101681007 B1 | 11/2016 |
|----|--------------|---------|
| RU | 2255311 C2 | 6/2005 |
| RU | 2266493 C1 | 12/2005 |
| RU | 2369843 C2 | 10/2009 |
| WO | 2005019778 A2 | 3/2005 |
| WO | 2019161716 A1 | 8/2019 |

OTHER PUBLICATIONS

Communication dated Dec. 19, 2022 issued in corresponding European Application No. 20203266.0.
European Search Report for corresponding registration 20 203 266.0-1001 dated Mar. 31, 2022.

* cited by examiner

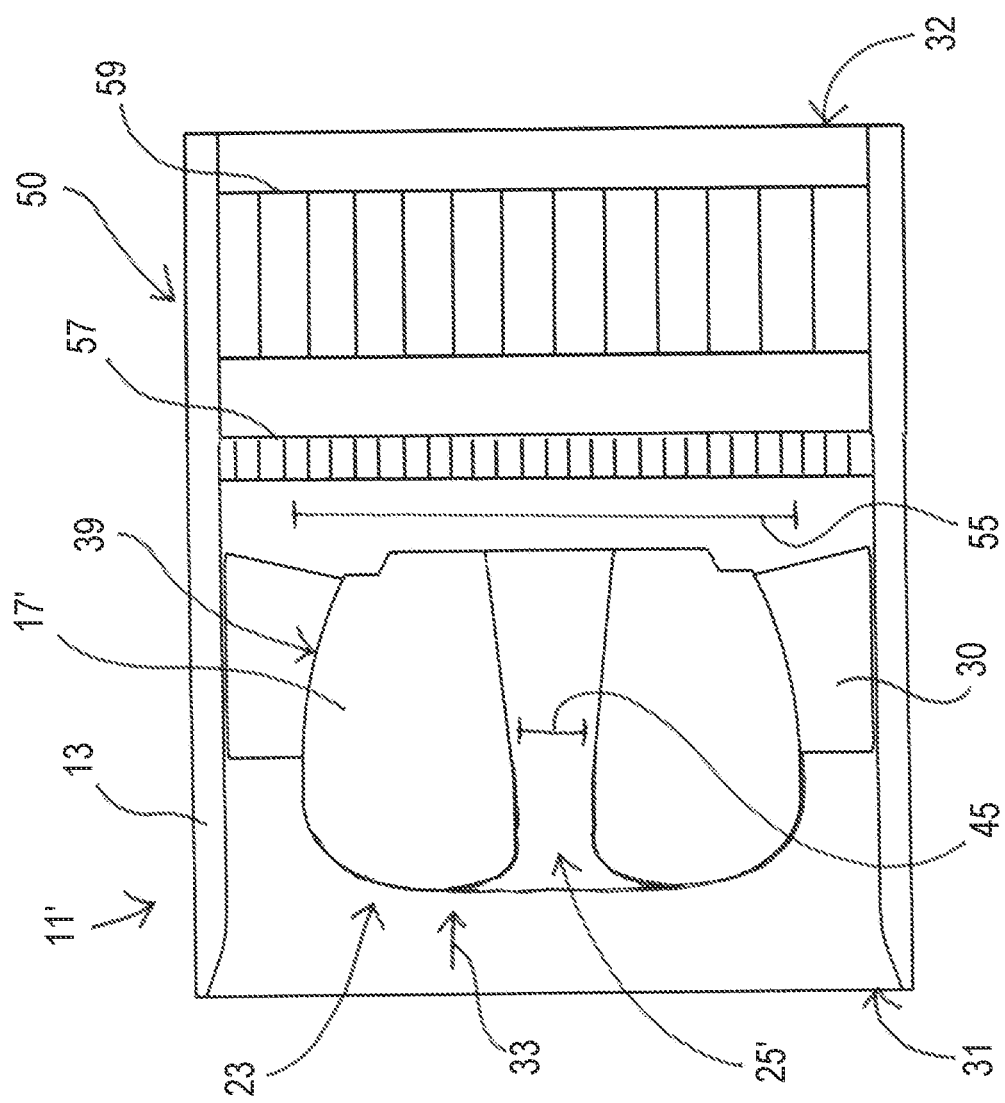

FLOW CONDITIONER

The invention relates to a flow conditioner for conditioning a fluid flow that comprises a pipe that has a pipe axis and that can be flowed through by a fluid in the direction of the pipe axis.

In many areas of technology, measurements are to be performed at flowing fluids, i.e. gases or liquids. For example, flow rates of flowing fluids in pipelines or channels can be determined by means of ultrasound measurement technology in accordance with the transit time difference method. A corresponding ultrasound measurement apparatus and a corresponding method are, for example, described in DE 10 2016 112 295 A1. The volume flow of the fluid flowing through the pipeline can be determined on the basis of the flow rate and the cross-sectional surface of the pipeline or of the channel. Such volume flow measurement apparatus are frequently used in the form of meters to determine delivery quantities and/or consumption quantities of gases or liquids.

In such measurements, a flow profile that is as uniform as possible is generally desired to ensure a high measurement accuracy. In practice, however, inhomogeneous or disturbed flow profiles are often present. In order nevertheless to ensure the required accuracy, the flow profile can be sampled by means of a plurality of measurement paths, which is associated with a high effort, however. Another possibility of increasing the measurement accuracy comprises arranging a flow conditioner upstream of the measurement point.

Flow conditioners, such as are, for example, disclosed in EP 2 607 718 A1, serve to condition disturbed flow profiles in front of the measurement point in the direction of undisturbed flows again. Known flow conditioners can have plates, metal sheets, and inner pipes that are oriented in the direction of an undisturbed flow. A swirl in the flow can in particular be successfully counteracted by such components. However, a possibly present skewness of the flow generally cannot be corrected by the components mentioned. In addition, it is difficult in practice to simultaneously achieve a high conditioning effect and a small pressure loss as well as a small construction size.

Efforts are therefore being made to enable a further improved flow conditioning and in particular to reduce the pressure loss and the construction size of the flow conditioners used for this purpose without unwanted separations or turbulences occurring.

This object is satisfied by a flow conditioner for conditioning a fluid flow having the features of claim 1.

A flow conditioner in accordance with the invention comprises at least one hub body that is rotationally symmetrical with respect to an axis of symmetry and that is fixed in the pipe such that the axis of symmetry coincides with the pipe axis, wherein the hub body fixed in the pipe has an onflow region that is arched outwardly against the onflow direction.

The hub body is therefore shaped and arranged similarly to the hub of a rotor; however, in contrast to such a hub, the hub body is not rotatably supported, but is fixed to the pipe.

It has been found that, even with a comparatively short axial length, such a hub body is capable of producing an at least largely uniform flow profile and of eliminating disturbances irrespectively of the onflow characteristics. In contrast to a plate having a surface normal oriented transversely to the direction of flow, the hub body of a flow conditioner in accordance with the invention enables a radial pulse exchange and can thereby also counteract a possible skewness of the flow. Since the onflow region is arched outwardly (i.e. is convex) against the onflow direction, the flow conditioner in accordance with the invention has a small pressure loss even when the onflow region is relatively large. Due to the shorter minimum length, the flow conditioner in accordance with the invention only requires little construction space. Furthermore, the energy requirement of an associated pump that effects the flow can be kept small due to the small pressure loss. The coaxial orientation of the rotationally symmetrical hub body in the pipe prevents the creation of disturbances by the hub body itself.

A particular advantage of the invention is that the characteristic curve of a flow conditioner in accordance with the invention, which represents an average raw error in dependence on the volume flow, is comparatively flat due to the hub body and in particular does not rise steeply at low volume flow values as in common systems. This enables a particularly robust measurement and is above all advantageous for the performance of calibrations since no complex correction function has to be managed. Instead, in the simplest case, the calibration can be accomplished by adding an offset value.

An embodiment of the invention provides that the hub body has an outer diameter to be measured radially with respect to the pipe axis that amounts to at least 40%, preferably at least 50%, further preferably at least 60%, and particularly preferably at least 70% of the inner diameter of the pipe and/or that the cross-sectional surface of the onflow region amounts to at least 20%, preferably at least 30%, further preferably at least 50%, and particularly preferably at least 60% of the cross-sectional surface of the pipe. In this respect, if the outer diameter of the hub body and/or the inner diameter of the pipe varies/vary along the pipe axis, the outer diameter of the hub body and the inner diameter of the pipe are to be determined at the same axial position, for example, at that position at which the outer diameter of the hub body is at a maximum. The term "cross-sectional surface" can be understood as the flow-effective cross-sectional surface or as the maximum cross-sectional surface along the pipe axis. A voluminous hub body is capable of so-to-say breaking up an existing, disturbed flow profile in order thus to enable the buildup of a uniform flow profile in the subsequent pipe section.

The hub body can have a diffuser section in which the cross-sectional surface of the hub body decreases along the pipe axis in a direction facing downstream. The diffuser section provides a slowing down of the fluid flowing past the hub body. The diffuser section preferably extends up to a downstream end of the hub body. A stabilized flow field can be formed downstream of the hub body.

In accordance with a further embodiment of the invention, the hub body is fixed in the pipe by means of at least one areal web, for example a plate-like web. The hub body can in this respect be formed in one piece with the web and/or with the pipe. The surface normal of the areal web is preferably oriented transversely to the pipe axis. The areal web not only holds the hub body in the desired position, but also counteracts a swirl, i.e. it fulfills a dual function. The axial length of the flow conditioner can be kept small despite the additional swirl-reducing component.

Provision can be made that the at least one areal web connects an inner wall of the pipe to a radially outwardly facing surface of the hub body.

A specific embodiment provides that the hub body is fixed in the pipe by means of a star-shaped arrangement of areal webs. Said arrangement ensures a secure hold and additionally a flow influence distributed uniformly along the periphery of the hub body.

The onflow region can have a dome-like arch. This ensures a low flow resistance of the hub body and avoids eddying. The arch can, for example, have a spherical shape. The radius of curvature can in this respect be adapted in an application-specific manner. Depending on the application, the onflow region can be hemispherical or slightly flattened, for example.

A further embodiment of the invention provides that the hub body is annular in cross-section and has a central through passage. A core flow is thereby generated that assists the buildup of a uniform flow in the wake of the hub body. The hub body is preferably circular in cross-section. The onflow region of the annular hub body can have a torus-like arch at least toward the onflow side. The longitudinal section through the arch of one of the radial halves of the annular hub body can be semicircular, for example. Other shapes are also possible, however.

The central through passage can have a diameter that increases along the pipe axis in the direction facing downstream. Such a through passage forms a diffuser that causes a slowing down of the fluid flowing through the channel. If, as described above, a diffuser section is likewise formed at the radial outer side of the hub body, the central through passage can be designed such that the speed levels of the central flow component and of the radially outer flow component behind the hub body are approximately equal.

In accordance with a further embodiment of the invention, a rotationally symmetrical additional body is arranged coaxially to the annular hub body in the central through passage. It has been found that such an additional body further improves the flow conditioning. Like the hub body, the additional body can have an onflow region that is arched outwardly against the onflow direction to keep the flow resistance low. This means that the additional body can form a further, inner hub body.

The additional body can likewise be annular, preferably circular, in cross-section. A further, inner through passage is thereby formed such that the incoming flow is overall divided into more part flows.

An inner through passage, whose diameter increases along the pipe axis in the direction facing downstream, can be formed in the annular additional body. A further diffuser component, which stabilizes the core flow, is thereby formed.

The hub body and the additional body can together have a cross-sectional surface that can be flowed onto and that amounts to at least 30%, preferably at least 40%, and particularly preferably at least 50% of the cross-sectional surface of the pipe. An arriving disturbed flow is thereby broken up particularly effectively.

A plurality of correspondingly designed additional bodies arranged coaxially to one another can generally also be arranged in one another.

It is preferred for the pipe to have an inner diameter of at east 10 mm and at most 500 mm, preferably of at least 20 mm and at most 200 mm. With such pipe sizes, the advantages of a flow conditioner in accordance with the invention are particularly pronounced. However, a flow conditioner in accordance with the invention is generally scalable in a comparatively broad size range in a simple manner.

In accordance with a further embodiment of the invention, the flow conditioner has a flow-conducting device that is arranged downstream of the hub body (that is, at its downstream end or therebehind in the direction of flow) and that comprises at least a perforated plate, a honeycomb body, a bundle of pipes, and/or a nozzle. A breaking up of the pulse balance of all the speed components in the total pipe cross-section can be achieved by a perforated plate. A non-symmetrical axial speed profile becomes more uniform through this breaking up. The perforated plate preferably has a square perforation. The honeycomb body, which can comprise passages that are separated by thin walls and that, for example, have a hexagonal cross-section, has a screening effect and thereby calms the flow. The constriction formed by the nozzle can have a curved course or a sectionally linear course in the longitudinal section. The hub body and the flow-conducting device can form a conditioning unit.

A preferred embodiment provides that the flow-conducting device comprises a perforated plate and a honeycomb body that is arranged downstream thereof. It has been found that with a combination of a hub body, a perforated plate arranged downstream thereof, and a honeycomb body arranged downstream of the perforated plate, it is possible to condition the flow virtually completely free of separations and in so doing to limit the axial length of the flow conditioner to an acceptable value.

The flow conditioner can have an axial length that amounts to at most twice and preferably at most 1½ times the inner diameter of the pipe and/or that has a pressure loss coefficient that amounts to at most 8 and preferably at most 5.5. Due to the embodiment in accordance with the invention, it is possible to provide flow conditioners that are particularly space-saving and/or that cause particularly little pressure loss. Due to the invention, it can even be possible to keep the axial length of the flow conditioner smaller than the inner diameter of the pipe and nevertheless to ensure an acceptable flow conditioning. The inlet length, that is the axial extent of the recirculation area present between the last component of the flow conditioner and the measurement point, can also be kept small due to the embodiment in accordance with the invention.

The invention also relates to a throughflow measurement system for measuring a fluid throughflow through a pipe, said throughflow measurement system comprising a measurement device, preferably an ultrasound measurement device, for performing a measurement at the fluid, in particular its flow rate, and a flow conditioner arranged upstream of the measurement device. In accordance with the invention, the flow conditioner is in this respect designed as described above.

The conditioning of the flow achieved by the flow conditioner in accordance with the invention reduces disturbances through an irregular flow, through a swirl, through an irregular distribution of the axial speed components, or through unfavorable acoustic signal effects due to turbulences such that the determination of the transit time difference of an ultrasound measurement is possible in a very precise manner for determining the fluid speed.

Further developments of the invention can also be seen from the dependent claims, from the description, and from the enclosed drawings.

The invention will be described in the following by way of example with reference to the drawings.

FIG. 3 is a lateral sectional view of a flow conditioner in accordance with a second embodiment of the invention.

Figure 1:
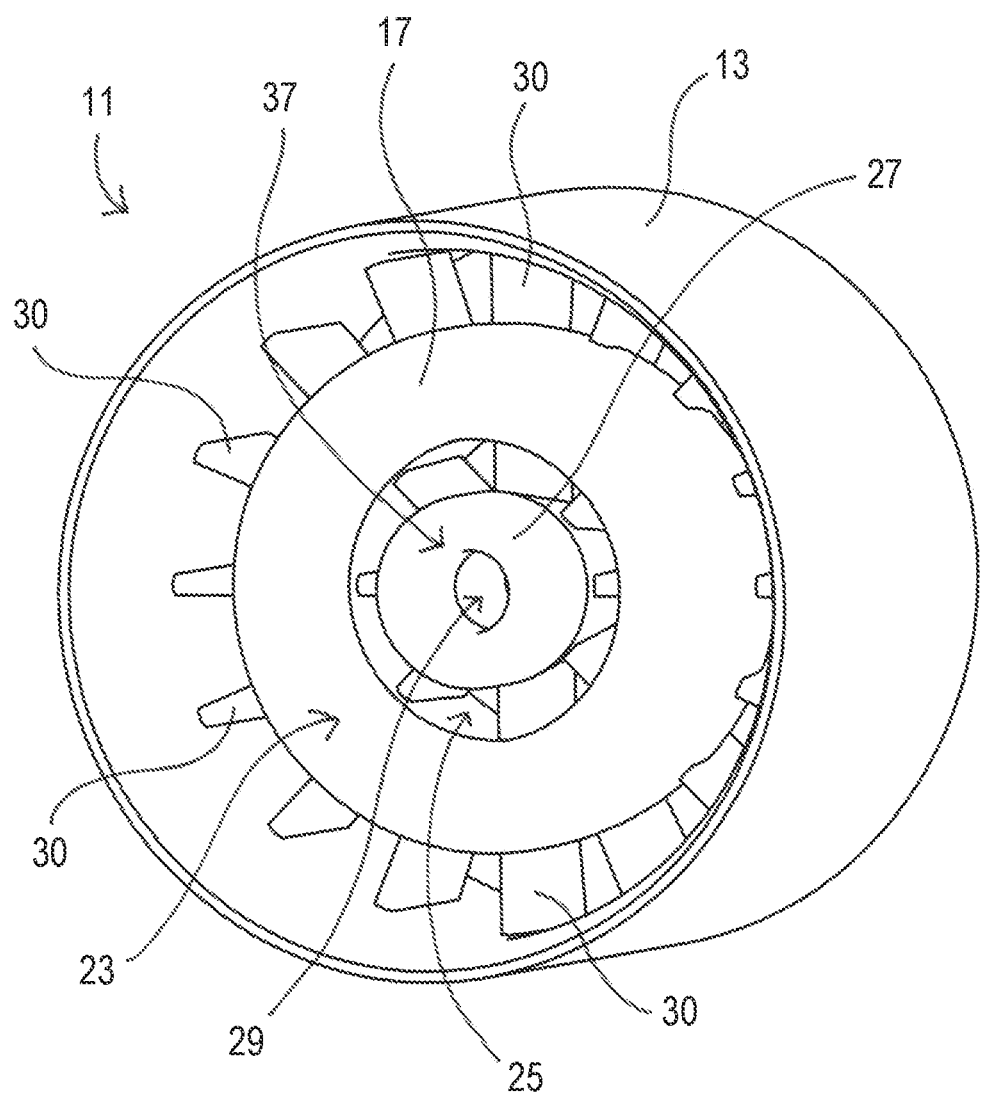
FIG. 1 shows a flow conditioner in accordance with a first embodiment of the invention in a perspective representation obliquely from the front.
Figure 2:
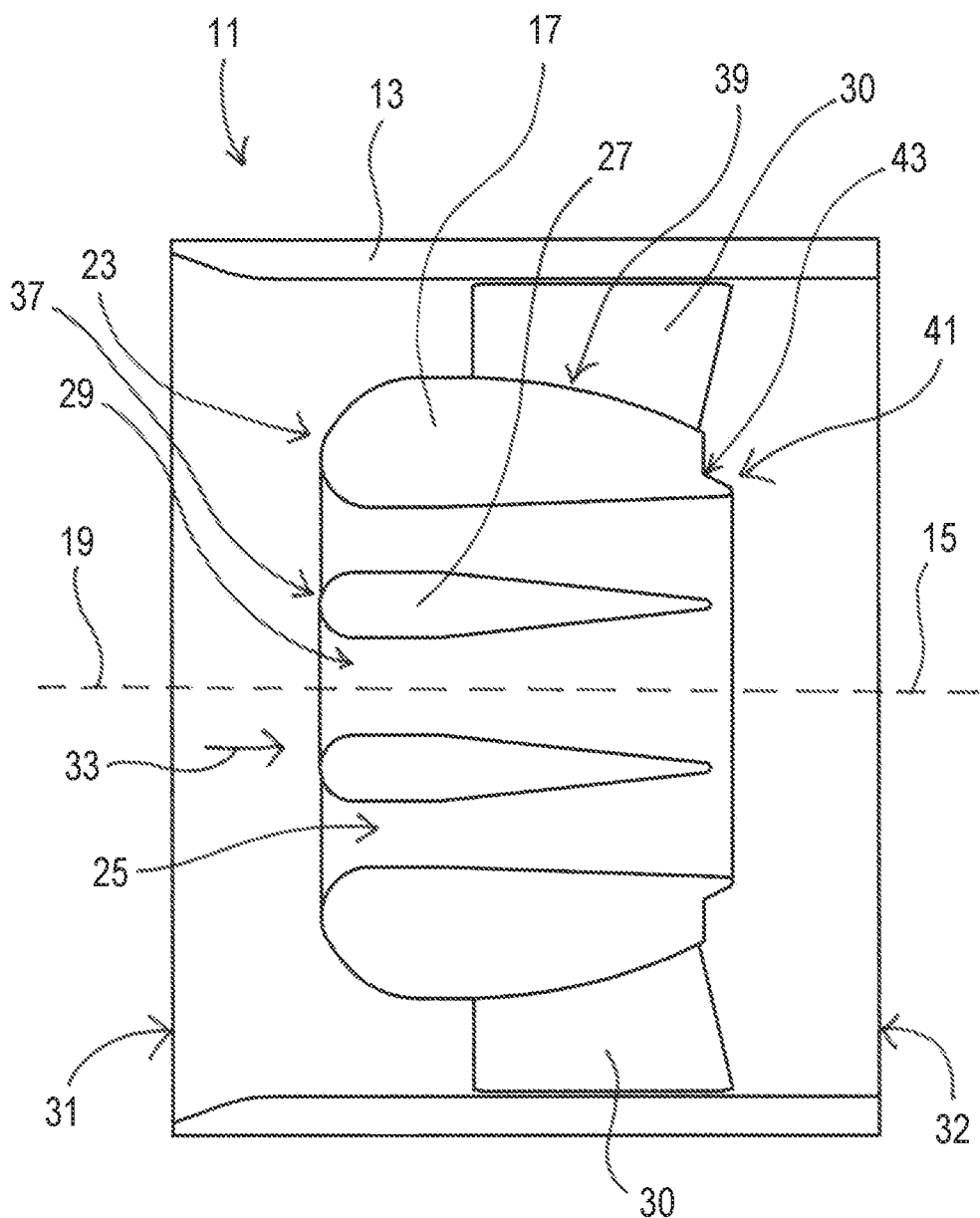
FIG. 2 is a lateral sectional view of the flow conditioner in accordance with FIG. 1.

The flow conditioner 11 shown in FIGS. 1 and 2 comprises a pipe 13 that has an at least substantially rectilinear course and that accordingly defines a pipe axis 15 (FIG. 2). The pipe 13 is insertable, for example as an intermediate element, into a flow passage, not shown, such that it can be flowed through by a fluid, preferably a gas, in the direction of the pipe axis 15.

An annular hub body 17, which is rotationally symmetrical with respect to an axis of symmetry 19 and has an arched onflow region 23, is arranged in the pipe 13. The hub body 17 is positioned such that the axis of symmetry 19 coincides with the pipe axis 15.

A rotationally symmetrical additional body 27 is located in the central through passage 25 formed by the annular hub body 17. It is likewise annular and, as shown, is arranged coaxially to the annular hub body 17. Due to the annular shape, an inner through passage 29 is formed by the additional body 27.

The hub body 17 and the additional body 27 are fixed in the pipe 13 by means of a star-shaped arrangement of areal webs 30. The areal webs 30 are oriented such that their surface normals face transversely to the pipe axis 15. The pipe 13, the webs 30, the hub body 17, and the additional body 27 are preferably produced from plastic. They can be formed by a single injection molded component.

The pipe 13 has an inlet side 31 and an outlet side 32. In the operation of the flow conditioner 11, the hub body 17 and the additional body 27 are flowed on from the inlet side 31 in an onflow direction 33. As can in particular be recognized in FIG. 2, the onflow region 23 of the hub body 17 facing toward the inlet side 31 is arched outwardly against the onflow direction 33. The onflow region 37 of the additional body 27 facing toward the inlet side 31 is also arched outwardly against the onflow direction 33. A streamlined shape of the hub body 17 and of the additional body 27 thereby results.

A diffuser section 39 adjoins the onflow region 23 of the hub body 17 in the direction facing downstream, in which diffuser section 39 the cross-sectional surface of the hub body 17 decreases continuously along the pipe axis 15, viewed in the onflow direction 33. In the embodiment shown, a step 43 is formed at the end 41 of the hub body 17 disposed downstream and additionally brings about a trailing edge effect, that is a targeted flow breakdown that, for example in the case of a very unfavorable inflow, can produce a minimal separation that is then rotationally symmetrical. An axial separation that is too long can thereby also be further reduced in the case of a very unfavorable inflow and the global flow profile can be further improved.

As shown, the diameter of the central through passage 25 increases continuously along the pipe axis 15 in the direction facing downstream, that is in the onflow direction 33, after the onflow region 33. The diameter of the inner through passage 29 also at least increases in the rear section along the pipe axis 15 in the direction facing downstream. Thus, in addition to the diffuser section 39 of the hub body 17, there are two further regions with a diffuser effect, namely the inner through passage 29 and the section of the central through passage 25 disposed radially outside the additional body 27.

In the embodiment example shown, the hub body 17 and the additional body 27 together have a cross-sectional surface that can be flowed onto and that amounts to approximately 45% of the cross-sectional surface of the pipe 13. The cross-sectional surface that can be flowed onto preferably amounts to at least 30% and at most 95% of the cross-sectional surface of the pipe 13.

The flow conditioner 11' shown in FIG. 3 likewise has a pipe 13 comprising a hub body 17' arranged therein. As in the previously described embodiment, the hub body 17' is annular and has a central through passage 25'. However, no additional body is arranged in said central through passage 25'. Furthermore, the minimum diameter 45 of the central through passage 25' here only amounts to approximately 14% of the maximum diameter 55 of the hub body 17', that is the central through passage 25' is comparatively small.

Furthermore, a flow-conducting device 50 is provided in the flow conditioner 11' in accordance with FIG. 3. It is arranged downstream of the hub body 17' and comprises a perforated plate 57 and a honeycomb body 59 positioned downstream of the perforated plate 57. The combination of the described hub body 17', the perforated plate 57 and the honeycomb body 59 has proven to be particularly effective with respect to the prevention of separations.

In principle, the hub body 17 shown in FIGS. 1 and 2, including the additional body 27, can also be combined with a perforated plate 57 and a honeycomb body 59 as shown in FIG. 3.

In an embodiment example that is not shown, a flow-conducting device is provided with at least one downstream nozzle section in which the pipe has a constriction. In an embodiment example that is likewise not shown, the hub body does not have a central through passage, wherein the onflow region has a closed, dome-like surface.

The flow conditioners 11, 11' described are used for conditioning fluid flows and are each inserted into a flow passage, for example a gas line, for this purpose. In the wake of the flow conditioner 11, 11', a measurement device such as an ultrasound measurement device is provided with which the fluid throughflow through the flow passage can be measured in a manner known per se.

Disturbances present in the flow, such as are, for example, caused by curves or constrictions upstream of the flow conditioner 11, 11', are effectively combated by the flow conditioner 11, 11'. In this respect, the hub body 17, 17' breaks up the disturbed flow and splits it into a core flow and one or two annular flows. On the passing through of the hub body 17, 17', the part flows are slowed down and stabilized due to the diffuser effect. The areal webs 30 simultaneously reduce a possibly present swirl. In the wake of the flow conditioner 11, 11', a mixing occurs in which an axial and radial pulse exchange takes place and the flow becomes more uniform overall. It is of particular advantage in this respect that an acceptable conditioning is already possible with a relatively short flow conditioner 11, 11'' in accordance with the invention, a short inlet length, and while accepting a relatively small pressure loss.

REFERENCE NUMERAL LIST 11, 11' flow conditioner
13 pipe
15 pipe axis
17, 17' hub body
19 axis of symmetry
23 onflow region
25, 25' central through passage
27 additional body
29 inner through passage
30 web
31 inlet side
32 outlet side
33 onflow direction
37 onflow region of the additional body
39 diffuser section of the hub body
41 end disposed downstream
43 step
45 diameter of the central through passage 50 flow-conducting device
55 diameter of the hub body
57 perforated plate
59 honeycomb body

The invention claimed is:

1. A flow conditioner for conditioning a fluid flow comprising:
 a pipe that has a pipe axis and that can be flowed through by a fluid in the direction of the pipe axis; and
 at least one hub body that is rotationally symmetrical with respect to an axis of symmetry and that is fixed in the pipe such that the axis of symmetry coincides with the pipe axis, wherein the at least one hub body fixed in the pipe has an onflow region that is arched outwardly against the onflow direction, wherein a cross-sectional surface of the onflow region is at least 50% of a cross-sectional surface of the pipe, and wherein the at least one hub body has a diffuser section in which the cross-sectional surface of the at least one hub body decreases along the pipe axis in a direction facing downstream.

2. The flow conditioner in accordance with claim 1, wherein the at least one hub body has an outer diameter measured radially with respect to the pipe axis that amounts to at least 40% of the inner diameter of the pipe.

3. The flow conditioner in accordance with claim 1, wherein the at least one hub body is fixed in the pipe by means of at least one areal web.

4. The flow conditioner in accordance with claim 3, wherein the at least one hub body is fixed in the pipe by means of a star-shaped arrangement of areal webs.

5. The flow conditioner in accordance with claim 1, wherein the onflow region has a dome-like arch.

6. The flow conditioner in accordance with claim 1, wherein the at least one hub body is annular in cross-section and has a central through passage.

7. The flow conditioner in accordance with claim 6, wherein the central through passage has a diameter that increases along the pipe axis in the direction facing downstream.

8. The flow conditioner in accordance with claim 6, wherein a rotationally symmetrical additional body is arranged coaxially to the annular at least one hub body in the central through passage.

9. The flow conditioner in accordance with claim 8, wherein the additional body is likewise annular in cross-section.

10. The flow conditioner in accordance with claim 9, wherein an inner through passage, whose diameter increases along the pipe axis in the direction facing downstream, is formed in the annular additional body.

11. The flow conditioner in accordance with claim 1, wherein the flow conditioner has a flow-conducting device that is arranged downstream of the at least one hub body and that comprises at least a perforated plate, a honeycomb body, a bundle of pipes, and/or a nozzle.

12. The flow conditioner in accordance with claim 11, wherein the flow-conducting device comprises a perforated plate and a honeycomb body that is arranged downstream thereof.

13. The flow conditioner in accordance with claim 1, wherein the flow conditioner has an axial length that amounts to at most twice the inner diameter of the pipe.

14. The flow conditioner in accordance with claim 1, wherein the flow conditioner has a pressure loss coefficient that amounts to at most 8.

15. The flow conditioner in accordance with claim 1, wherein the at least one hub body has a downstream end with a step-shaped profile.

16. A throughflow measurement system for measuring a fluid throughflow through a pipe, said throughflow measurement system comprising:
 a measurement device for performing a measurement at the fluid and a flow conditioner arranged upstream of the measurement device,
 wherein the flow conditioner comprises:
 a pipe that has a pipe axis and that can be flowed through by a fluid in the direction of the pipe axis; and
 at least one hub body that is rotationally symmetrical with respect to an axis of symmetry and that is fixed in the pipe such that the axis of symmetry coincides with the pipe axis, wherein the at least one hub body fixed in the pipe has an onflow region that is arched outwardly against the onflow direction, wherein a cross-sectional surface of the onflow region is at least 50% of a cross-sectional surface of the pipe, and wherein the at least one hub body has a diffuser section in which the cross-sectional surface of the at least one hub body decreases along the pipe axis in a direction facing downstream.

17. The throughflow measurement system in accordance with claim 16,
 wherein the measurement device is an ultrasound measurement device.

18. The throughflow measurement system in accordance with claim 16,
 wherein the measurement device is configured to measure a flow rate of the fluid.

19. The throughflow measurement system in accordance with claim 16, wherein the at least one hub body has a downstream end with a step-shaped profile.

20. A flow conditioner for conditioning a fluid flow comprising:
 a pipe that has a pipe axis and that can be flowed through by a fluid in the direction of the pipe axis; and
 at least one hub body that is rotationally symmetrical with respect to an axis of symmetry and that is fixed in the pipe such that the axis of symmetry coincides with the pipe axis, wherein the at least one hub body fixed in the pipe has an onflow region that is arched outwardly against the onflow direction, wherein a cross-sectional surface of the onflow region is at least 50% of a cross-sectional surface of the pipe, wherein the at least one hub body is annular in cross-section and has a central through passage, and wherein the central through passage has a diameter that increases along the pipe axis in the direction facing downstream.

* * * * *